Jan. 26, 1937.　　　V. MULHOLLAND　　　2,068,924
REGENERATOR TANK AND METHOD OF OPERATING THE SAME
Filed Dec. 2, 1932　　6 Sheets-Sheet 3
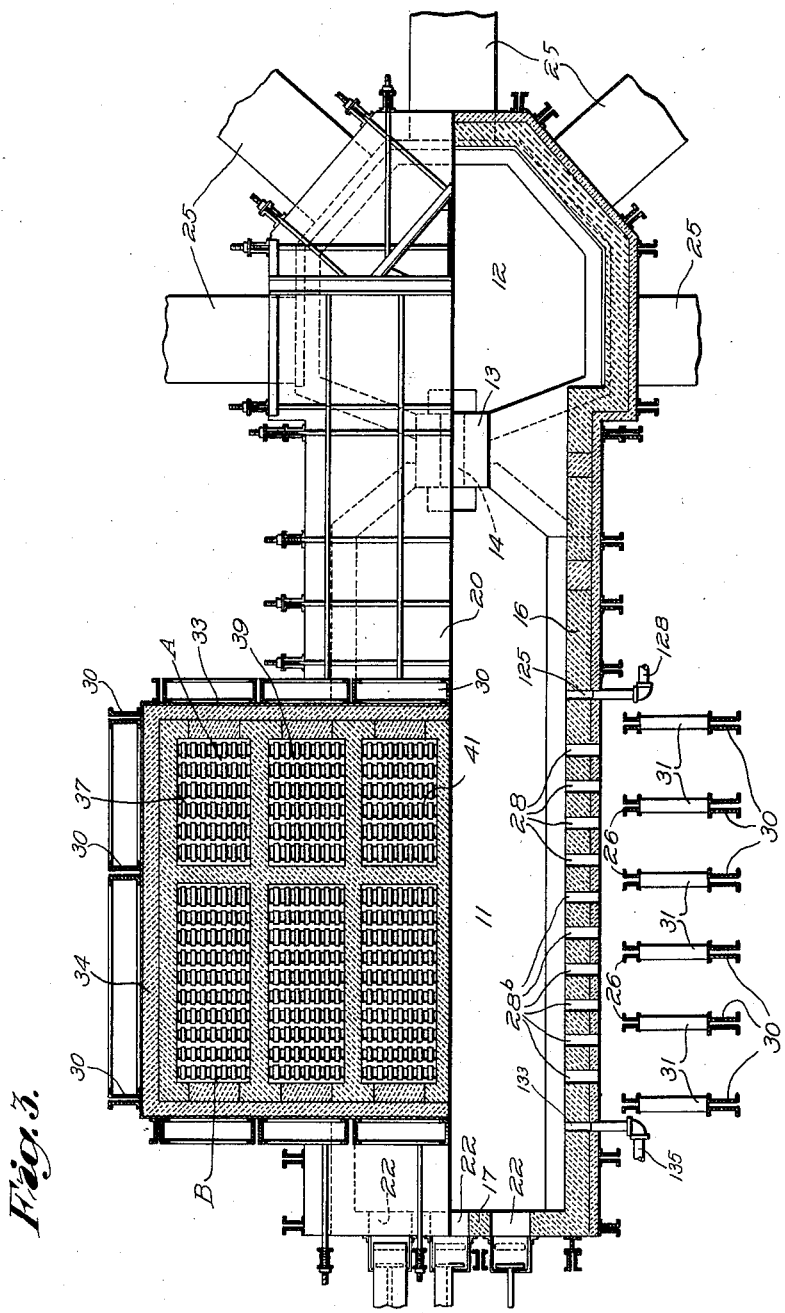

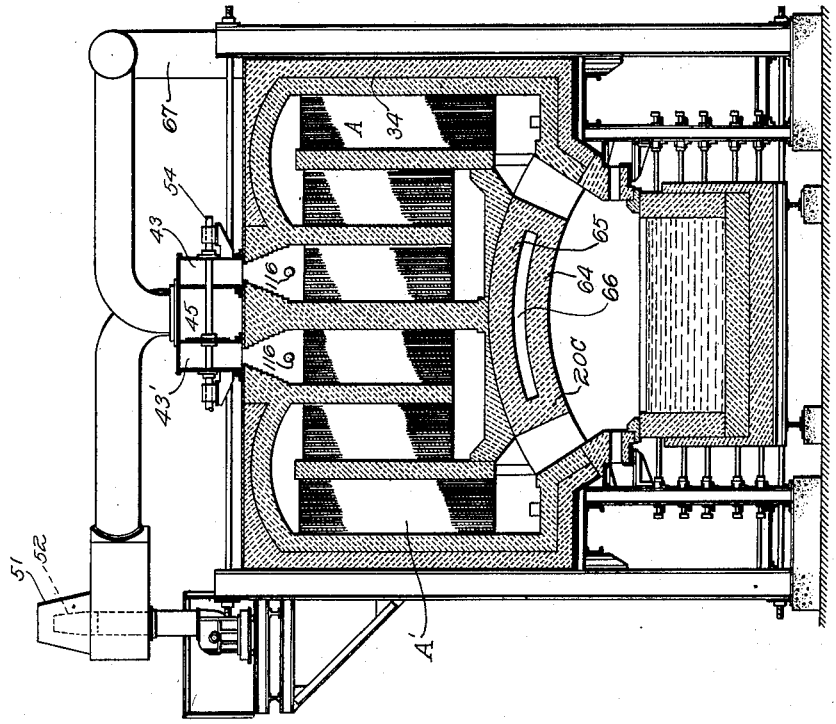
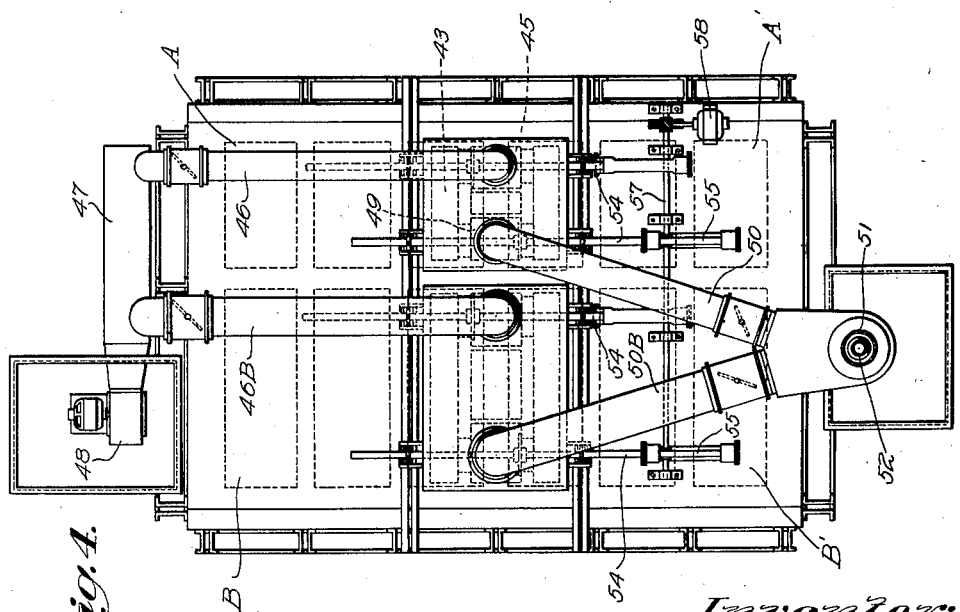

Jan. 26, 1937. V. MULHOLLAND 2,068,924
REGENERATOR TANK AND METHOD OF OPERATING THE SAME
Filed Dec. 2, 1932 6 Sheets-Sheet 5

Witness;
W. B. Pfluger

Inventor;
Vergil Mulholland
by Bunn & Catlaw
Attorneys

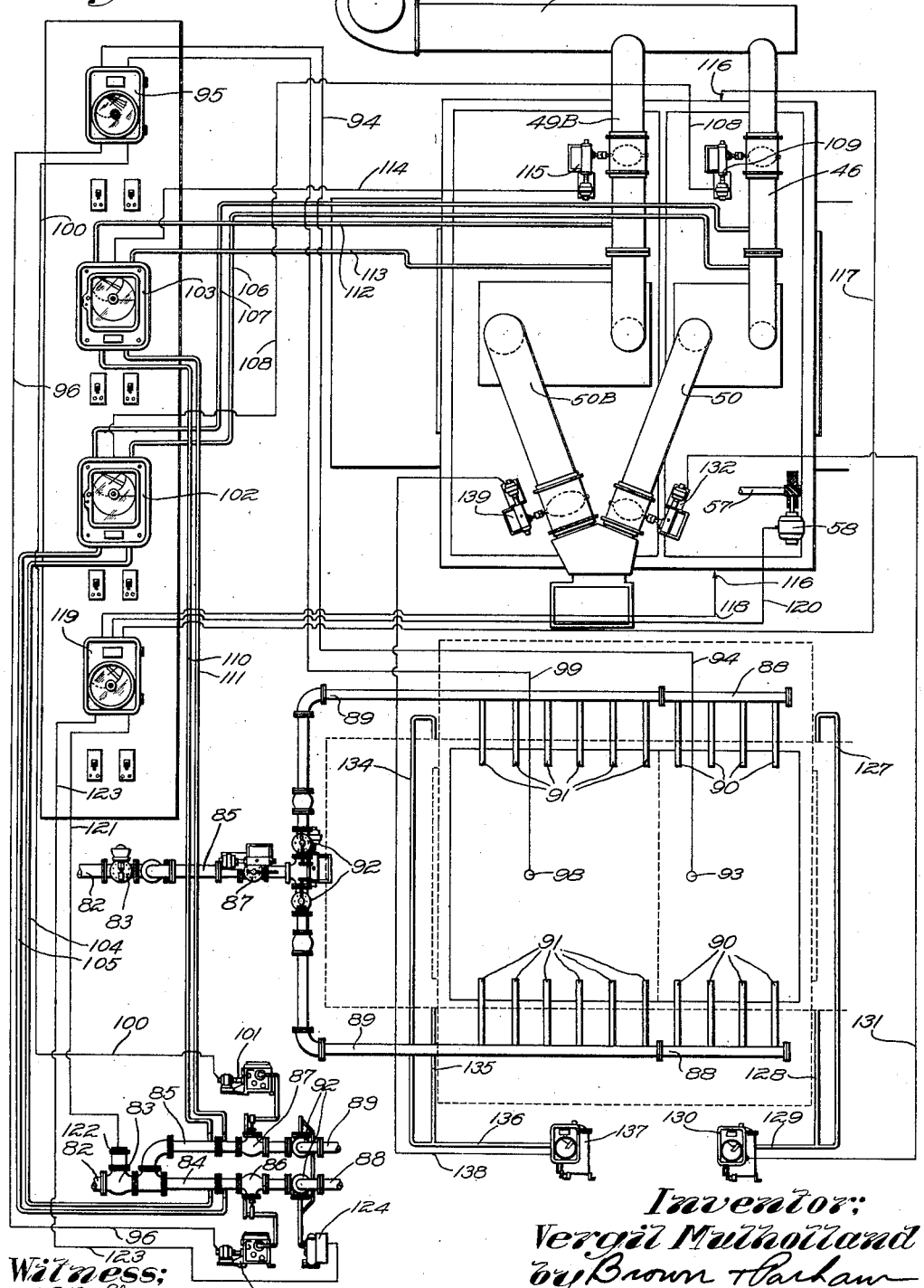

Patented Jan. 26, 1937

2,068,924

UNITED STATES PATENT OFFICE 2,068,924

REGENERATOR TANK AND METHOD OF OPERATING THE SAME

Vergil Mulholland, West Hartford, Conn., assignor to Hartford-Empire Company, Hartford, Conn., a corporation of Delaware Application December 2, 1932, Serial No. 645,347

39 Claims. (Cl. 49—54)

This invention relates to methods and apparatus for continuously making glass of better and more uniform quality and at a reduced cost. It contemplates the melting, refining and homogenizing of glass in a continuous tank and provides novel apparatus and method steps which separately and in combination tend to produce such uniform glass at a reduced cost.

In certain aspects this invention is similar to and constitutes a continuation in part of my prior application, Serial No. 405,975, filed Nov. 9, 1929, now Patent No. 1,941,410 granted Dec. 26, 1933.

The following are among the novel features of the invention:

1. The provision of a furnace having a glass containing basin in which materials are melted and refined, and which is so formed as to provide a glass bath deeper adjacent to its longitudinal central portion than at either end thereof.

2. The provision of controlled heating means for applying heat locally to the surface of the glass at such deeper portion and adapted to maintain the glass in this portion at a constant temperature higher than that of the glass at the ends of the melting chamber.

3. The provision of a bottom for the melting chamber which slopes upwardly from the deeper portion toward either end, providing progressively shallower portions of the bath which are maintained cooler than the deeper portions. By these arrangements, active convection currents in the glass rising at the deeper portion, extending in either direction therefrom and returning along the sloping bottom walls are established and controlled.

4. The provision of a forward portion of the melting chamber beyond the immediately effective zone of either of the heating means, designed for controlled cooling of glass to aid in the establishment and maintenance of the desired convection currents aforesaid.

5. The provision of differential heat insulating characteristics in different portions of the bottom, side and top walls of the melting chamber, particularly the provision of greater insulation at and around the deepest portion of the bath.

6. The arrangement in combination with the aforementioned features of means for continuously feeding glass making materials at the rear end of the melting chamber and separately controlled heating means other than that heretofore mentioned for supplying the heat of fusion to the glass making materials.

7. The provision at the charging end for shielding the incoming glass making materials from combustion gases and gaseous currents until such time as the glass making materials become fritted.

8. The provision of a highly efficient heat recovery system comprising regenerators giving effective heat recovery and uniform operation, the regenerators being provided with means for positively controlling the inlet and exhaust of air and gases and being designed to prevent "breathing" or in-leakage of air. Also, the provision of valves and control means of novel character which assure uniform and controlled operation at all times.

9. The arrangement of the means for introducing fuel and preheated air separately into the melting chamber and in a manner to assure prompt and complete mixing thereof, so that combustion will take place only within the melting chamber.

10. The arrangement of burners and air ports such as to provide a substantially complete blanket of flame across the entire surface area of the glass between opposing banks of fuel and exhaust ports.

11. The proportioning of the glass basin and its associated ports and the air supplying means so that a relatively short preferably neutral flame may be employed which provides substantially uniform heating transversely of the basin.

12. The provision of:
 (a) Automatic control of the reversal of the regenerators at the end of relatively short increments of time and in response to the heat conditions in the heat recovery system.
 (b) Automatic regulation of the heat supplied adjacent to the deep portion of the glass bath in accordance with the heat condition adjacent to that point of the furnace.
 (c) Automatic control of the rearward heat supply system in accordance with the temperature of the furnace at the charging end thereof.
 (d) Automatic control of the pressure in the furnace.
 (e) The combination of the controls by which a substantially uniform temperature may be maintained in the deep portion of the bath independently of the pull on or feed into the tank and by which the heat applied by the rear heat supply system may be regulated in accordance with variations in the feed and pull upon the tank and the desired differential in the heat condition of the glass in these two portions of the tank may be attained.

13. The provision of regenerators employing a plurality of vertical flights for carrying gases and air preferably in a tortuous path by means of which the system is of ample scope for the efficient recovery of heat and at the same time may be provided in a compact structure, economizing factory space.

14. The provision of regenerators at levels above the crown of the furnace and in which the first flights of exhaust gases are in an upward direction and of sufficient extent and cooling effect that substantial portions of the batch dust and other solid ingredients of the waste gases will liquefy and flow downward. In such an arrangement the drippings from the regenerator do not return to the furnace, but are collected at a suitable point from which they may be readily removed.

15. The provision of a furnace designed as a whole to permit the fuel ports to be as closely spaced as desired and to permit ready access at all times to the burners and the basin walls without interference from the regenerators.

16. The provision of separate supporting structure for the basin, the crown and the heat recovery system, such that the tendencies to differential expansion causing leakage into the chamber are greatly minimized or avoided.

The foregoing and other features, separately and in combination, and with other features which will appear from the following specification, aid in the practice of my novel method and provide material advantages over the prior art.

The accompanying drawings illustrate furnaces embodying the apparatus features of the invention adapted and designed for the practice of my novel method of glass making. In the drawings:

Fig. 3 is a view in horizontal section of a slightly modified embodiment of my invention taken on a broken line, as the line 3—3 of Fig. 2;

Fig. 4 is a plan view of certain of the regenerator structures of the forms of the invention shown in Figs. 1 to 3;

Fig. 5 is a view similar to Fig. 2 showing a modified form of the invention;

Fig. 8 is a diagrammatic view illustrating the various automatic controls and their application to the embodiments of the invention shown in Figs. 1 to 4.

Figure 1:
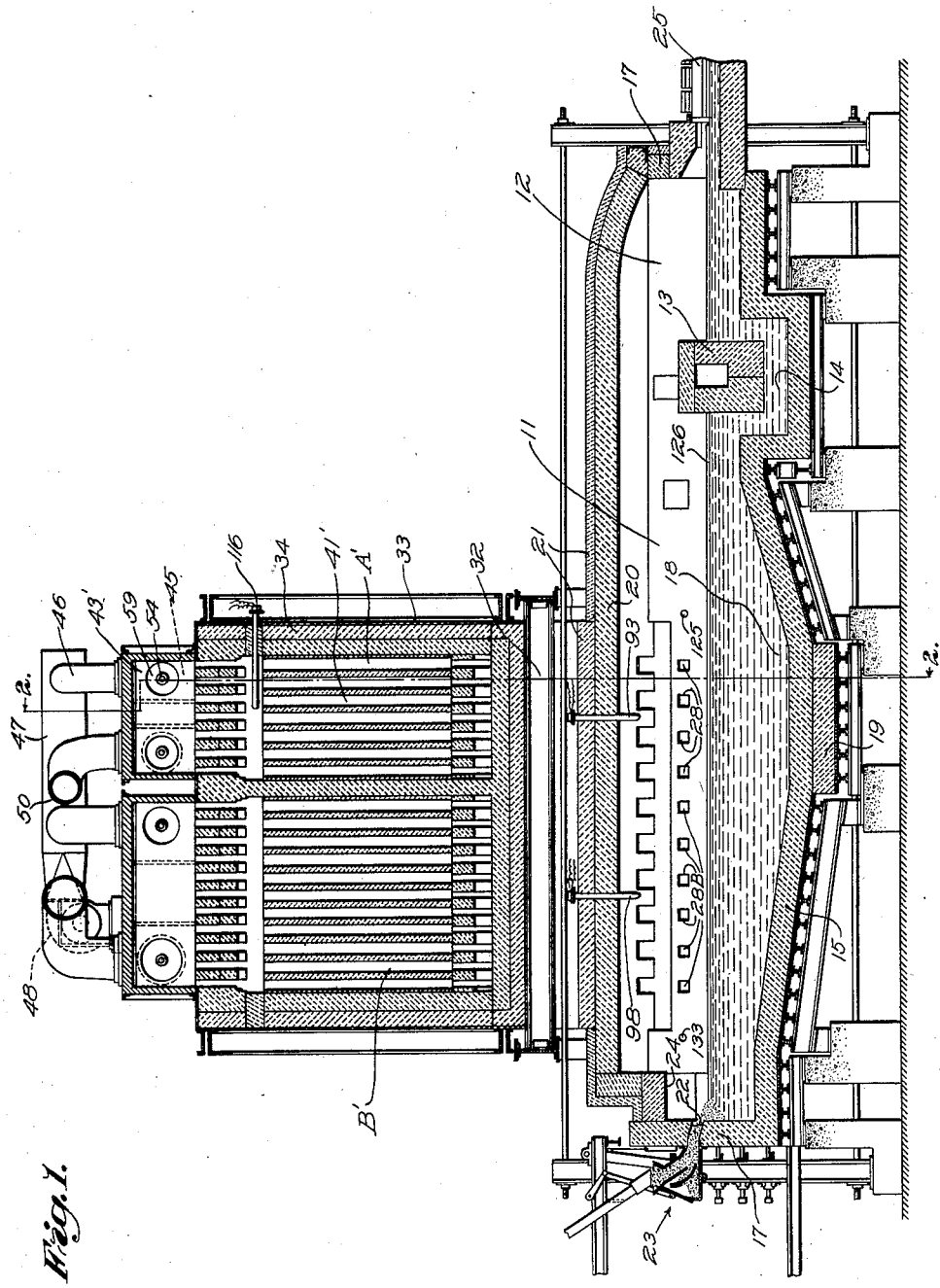
Figure 1 is a view in vertical section of one embodiment of the invention taken on the line 1—1 of Fig. 2.

Referring particularly to Figs. 1 to 4 inclusive, the furnace therein shown comprises an enclosed tank divided into a melting chamber 11 and a workout chamber 12, separated by a dividing wall 13 and connected below the glass line by a throat 14. The lower portion of the structure, comprising the glass containing basin, is built of flux blocks forming the bottom 15, side walls 16 and end walls 17. The blocks forming the major portion of these walls may be of any known type of flux block and are preferably uninsulated, save as hereinafter pointed out. The glass basin of the melting chamber is preferably relatively long and narrow. In the particular furnace depicted it is 8 feet wide and 30 feet long and is designed to contain a bath of glass of varying depths as indicated in Fig. 1. The bottom wall 15 slopes downwardly from a point slightly forward of the rearward end of the furnace to a point somewhat short of the center of the melting chamber, is then horizontal for a distance (approximately 6 feet in the furnace of the size above mentioned), then slopes upwardly and is again horizontal at a higher level just in advance of the entrance to the throat 14. Thus the glass bath contained in the melting section 11 is relatively shallow at its rearward end (say 24 inches in depth), increases in depth toward the central portion (until the glass is approximately 42 inches in depth), then decreases until it reaches a still shallower depth (say 18 inches) prior to reaching the entrance of the throat 14.

I prefer to employ at least in the bottom and side walls of that portion 18 of the glass containing basin which holds the deeper portions of the bath, particularly high grade refractory and glass resistant blocks which are preferably heavier than the glass to be contained in the furnace, such blocks being preferably of the character of those described in the patents to Paul G. Willetts, Nos. 1,605,885 and 1,802,296, granted Nov. 2, 1926 and April 21, 1931 respectively. I preferably surround this portion 18 by suitable heat insulation 19.

The furnace is covered by an arch roof or crown 20. In the forward portions of the structure this crown may be of the usual construction, and if desired, built of the usual silica brick, although for the best results I prefer the employment in all portions of the crown of the refractory material described in the patent to Paul G. Willetts, No. 1,893,313, granted Jan. 3, 1933. The crown is preferably covered by insulation 21 of suitable thicknesses and insulating qualities to accomplish the results hereinafter described.

In the rear wall of the furnace are suitable slots or openings 22 through which glass making materials may be fed to the furnace by suitable automatic feeding means generally indicated at 23, which is preferably such as is described in the copending application of Everett O. Hiller, Serial No. 639,778, filed October 27, 1932, now Patent No. 1,941,897, granted Jan. 2, 1934. A slightly different type of feeding device for the glass making materials is illustrated in Fig. 3, but will not be described in detail as it per se forms no part of the present invention.

Adjacent to the rear wall of the furnace, I provide a crown 24 at a level suitably below that of the crown 20 as a shield for the incoming glass making materials from which heat may be radiated to frit over these materials prior to their movement into the streams of gases of combustion in the furnace.

The material feeding means 23 preferably extends substantially the entire distance across the rear end of the furnace and feeds glass making materials at a controlled rate entirely across the rear of the furnace. Such feeder may be, and preferably is, driven by an electric motor (not shown), the speed of which may be suitably controlled automatically in response to variations in the level of the glass in the tank, whereby the level of the glass in the tank may be maintained independently of variations in the "pull" thereon by feeders or other withdrawing means which are generally indicated by the forehearths 25 (Figs. 1 and 3).

The crown 20 of the tank is supported independently of the glass containing basin on relatively short stays or supports 26. For this purpose the crown 20 is formed as an arch sprung between skew blocks 27, which are in turn directly supported by the stays 26 and which may have depending portions provided with suitable fuel openings 28 and 28B directed substantially horizontally into the furnace chamber and terminating outside the periphery of the glass bath. Alternatively, the fuel openings may be formed in suitable burner blocks supported rigidly with the skew blocks 27. Intermediate the skew blocks 27 and the upper edge of the glass containing basin are tuck stones 29 which are adapted to close this intermediate space with a substantially air tight fit in a vertical joint between them and the contiguous skew blocks 27. Provision is made for relative vertical expansion at this point by the allowance of a small space, perhaps half an inch, between the upper horizontal face of the tuck stones 29 and the lower horizontal face of the skew blocks 27. The relatively short vertical stays 26 and the associated construction as shown and described above provide a minimum of relative expansive movement of the parts such as would tend to break the seal at the tuck stones upon the heating of the furnace, thus permitting a predetermined pressure to be maintained within the furnace at all times. The fuel openings 28 and 28B are arranged in both sides of the tank and are sufficiently numerous and closely spaced to provide a substantially continuous sheet of fuel when in operation.

Figure 2:
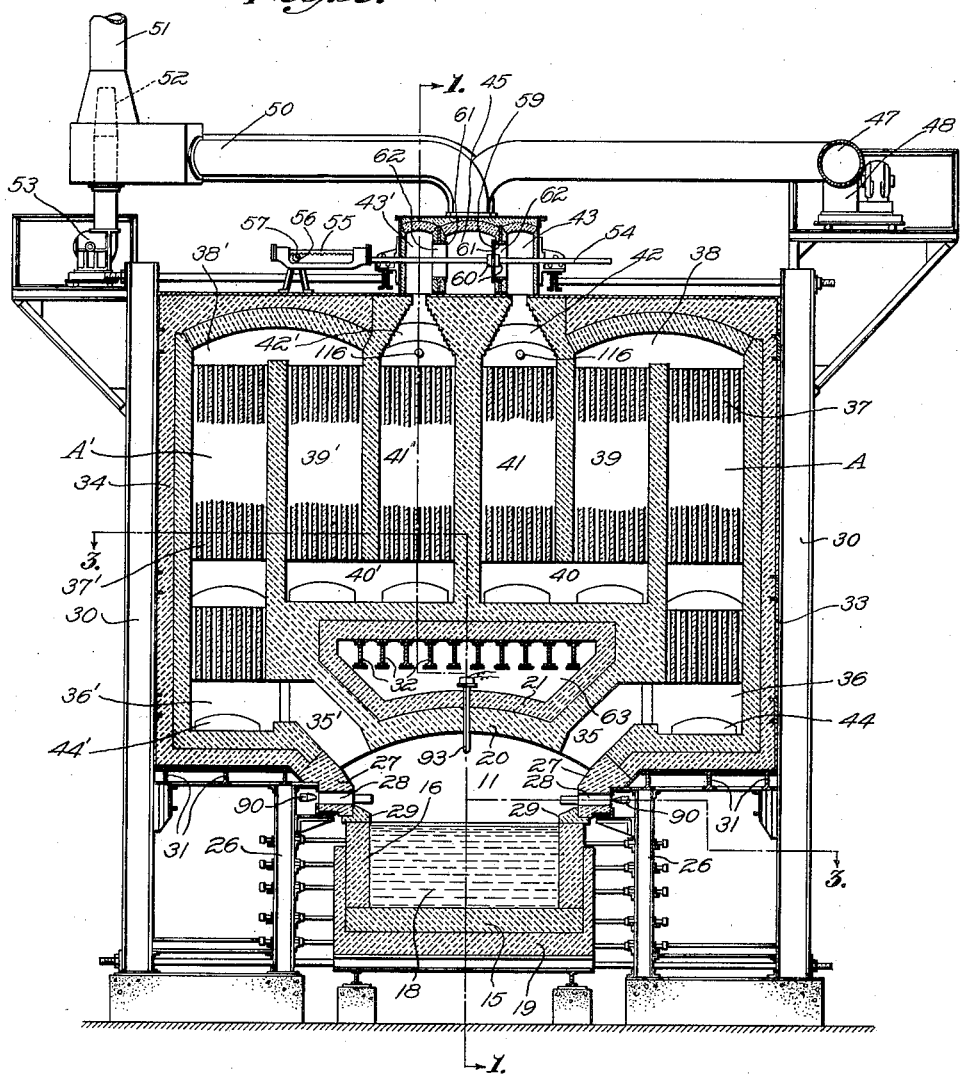
Fig. 2 is a view in vertical section taken on the line 2—2 of Fig. 1.
Figure 6:
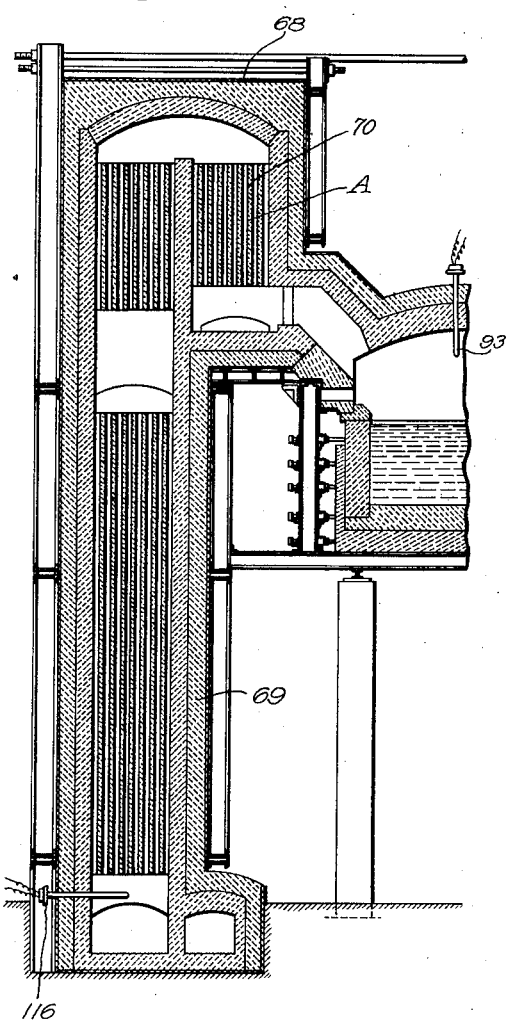
Fig. 6 is a fragmentary view in vertical section of another form of the invention.
Figure 7:
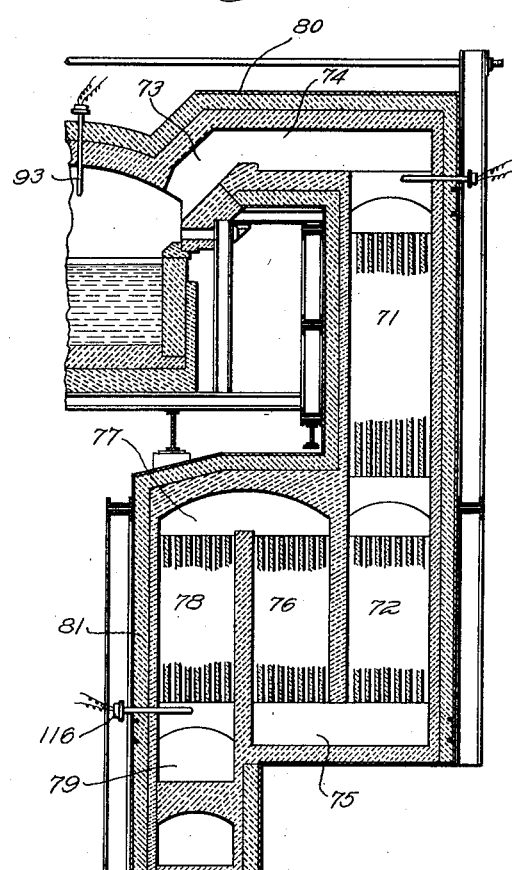
Fig. 7 is a fragmentary view in vertical section similar to Fig. 6 showing a still further form of the invention.

As shown in Figs. 1 to 3, the regenerator system is mounted above the crown of the rearward and central portions of the melting chamber. These regenerators are contained in a single structural unit supported in part by the crown 20 and in part by the stays 26 and in part by buck stays 30 and a structural steel frame including beams 31 and 32. This unit is preferably sheathed in a steel jacket 33 to prevent in-leakage or "breathing" of the regenerators. Inside of this jacket I provide a suitable layer of heat insulating material 34. The valve means for reversing and regulating the regenerators are preferably mounted on the top of the structure as hereinafter to be described. While all the regenerators are preferably built as a unit, they need not necessarily be so, but may be built as indicated by Figs. 6 and 7 on either side of the furnace, and may extend laterally from and below the glass basin. However, it is noted that certain important features of the firing arrangements are present in all of the regenerative systems illustrated.

In the forms of the invention shown in Figs. 1 to 4 inclusive, the heat recovery system, though there shown as built of the unitary structure, comprises two sets of regenerators, a forward set A, A' and a rearward set B, B'. The regenerators A, A' are mounted directly above the deeper portion 18 of the glass containing basin, and are connected by flues 35, 35' passing through the crown 20 with the melting chamber. These flues alternately deliver preheated air and receive exhaust gases. The preheated air is projected directly into the furnace chamber at a substantial angle (as shown approximately 60°) to the path of the fuel entering through the openings 28. This air first meets the fuel over the edge of the glass bath and promptly and intimately mixes with the fuel, causing rapid combustion beginning adjacent to the edge of the bath, and extending across the relatively narrow bath. This arrangement, coupled with the frequent reversal of the regenerators maintains substantially uniform temperature in this glass transversely of the furnace.

As shown, a flue 35 or 35' is provided directly above each fuel opening 28, and these flues, like the fuel openings, are so numerous and close together as to assure a substantially continuous sheet of flame covering the portion of the glass under the banks of openings or ports 28. Exhaust gases entering a flue 35 or 35' pass to chambers 36 or 36' and thence upwardly through flights 37 or 37' of the regenerators, thence by the cross passage 38 or 38', thence downwardly through flight 39 or 39', thence by cross passage 40 or 40', thence upwardly through flight 41 or 41' to passage 42 or 42' leading to the valve box 43 or 43'. Each flight of the regenerators provides a series of narrow vertical passages which are substantially free of obstructions. The internal construction of each regenerator section forms the subject matter of a separate invention and hence is not claimed in this application.

Preferably the first flight 37 or 37' of the regenerator is of sufficient length that waste gases passing therethrough will be sufficiently chilled before reaching the top of this flight to cause the condensation or liquidation of a large proportion of the condensable batch dust and other normally liquid or solid material contained in the flue gases. Such material as liquefies or solidifies in this first flight will fall or run downwardly and be progressively heated by the progressively hotter lower portions of the regenerator which will augment this downward movement, the material collecting in the chambers 36 or 36' from which it may easily be removed through a door 44 or 44'. Thus the regenerator is made self-clearing, and "slagging" is greatly reduced.

The arrangement of the regenerator in a series of flights 37, 39 and 41 give to the air and gases a tortuous passage toward and from the flues 35. This arrangement provides, in a compact unit, a regenerative system of large capacity.

The regenerator A is connected alternately to exhaust and air supply by the following mechanism. The valve box 43 communicates by a valved opening with a box 45 connected by pipe 46 to a header 47 which in turn communicates with a pressure supplying fan 48. The box 43 also communicates by a valved opening with a box 49 connected by a pipe 50 to a stack 51 into which is projected an induction nozzle 52 communicating with a fan 53. The opposite regenerator A' is connected to a box 43' which similarly communicates alternately with the boxes 45 and 49.

As best shown in Figs. 2 and 4, the communication of each box 43, 43' with air supply and exhaust is controlled by two valve mechanisms, each comprising a shaft 54, one end of which carries a rack 55 adapted to be driven by a pinion 56 on a common transverse shaft 57 driven by suitable reversible motor 58. Each shaft 54 carries a metallic plate or disk valve 59, which is preferably loosely mounted on the shaft between spaced collars 60 to permit the valve to seat upon the edges 61 of the openings 62 of the passages between the box 45 and boxes 43 and 43'. The driving means for the shafts 54 are so arranged as to move the valves in opposite directions upon each reversal of the furnace. When the valves 59 are in the positions shown in Figs. 4 and 2, the regenerator A is connected through boxes 43 and 49 to the exhaust while the communication of box 43 with the air supply is shut off by the valve. The regenerator A' is at the same time connected with the air supply and disconnected from the exhaust.

Heretofore, it has been the usual practice to reverse the regenerators at the end of given intervals of time, say 20 minutes, but this practice has tended to create fluctuations in the supply of heat to the furnace between the beginning of a phase of operation of the regenerator and the reversal of such operation. I contemplate the reversal of the regenerators of my furnace at the ends of relatively short periods, such reversal to be effected automatically in response to variations in certain predetermined heat conditions in the regenerators or to the differential between the heat conditions in different parts of the regenerator system. The general arrangements for effecting this automatic reversal will be described hereinafter.

The principal function of the forward regenerators A, A' is to supply heat to the glass in the portion 18 of the basin, which portion preferably is maintained at a constant temperature higher than that in other portions of the furnace. As I visualize the operation of the furnace, the forward regenerators A, A' and their associated fuel supply means including fuel ports 28 will constantly supply the heat which is necessary to compensate for the fixed loss through the walls of the furnace and to maintain the glass in the portion 18 at the desired temperature, while the heat supplied by the rearward regenerators B, B' and their associated fuel supply means including ports 28B is introduced primarily to supply heat to fuse the incoming glass making materials at the rate required by the pull on the tank. Thus the furnace effectively supplies a want long felt in the art, in that it will maintain constant, or substantially so, the condition of the glass during periods in which the glassware formation operations are discontinued, and when no glass making materials are fed into the tank. Thus the furnace may be shut down over Sundays and when again put in service on Monday morning will promptly deliver glass of the desired character and quality.

I propose that the maintenance of fire from the forward set of fuel ports 28 and the air supplied by regenerators A, A' be controlled in accordance with the temperature condition existing adjacent to the portion 18, and therefore I provide a suitable automatic mechanism and fuel and air proportioning means later to be described for accomplishing these purposes. To further assure the intended and automatic operation of the furnace, I propose to automatically control the pressure in the furnace chamber and to that end provide automatic control means later to be described.

The construction and system of controls for the regenerators B, B' is similar to that above described for the regenerators A, A', the controlling mechanism preferably being mounted, as shown in Fig. 4, side by side with that controlling regenerators A, A'. The air supply in this system comes from the same source (fan 48) through the branch pipe 46B communicating with the header 47, and the exhaust is through the branch pipe 50B.

It is noted that in the form of invention shown in Figs. 1 to 4, the major portion of the weight of the central portions of the regenerators is carried upon structural members 32 which may be cooled, if desired, by the passing of air through the space 63. If desired, this air may communicate with the intake of the fan 50 and so be supplied to the regenerators, the air connections to accomplish this purpose not being particularly illustrated in the accompanying drawings.

In the form of my invention shown in Fig. 5, the regenerators A, A', B, B' are somewhat differently supported. The crown 20C in that portion of the furnace, above which the regenerators are located, consists of a series of superimposed arches 64 and 65 which provide an opening or passage 66 therebetween through which air supplied to the fan 48 is drawn and preheated by contact with the uninsulated crown of the furnace, the passage 66 communicating with the fan through an air duct 67 for this purpose.

The arrangement shown in Fig. 5 depends largely for its success upon the use of special materials for the crown, particularly materials having adequate resistance to heat and slagging, and capable of supporting considerable loads while at high temperatures. These materials must also have an extremely low and uniform expansion at temperatures through which the furnace is heated, as it is necessary that they move but little, if any, upon the changes in temperature conditions. The construction is practical only when the furnace is relatively narrow, as is the case of my present embodiment. The usual material used in the crowns of furnaces, silica brick, is unsuited for this construction.

I propose to use in the construction of the crown of the furnace of Fig. 5, materials evolved by Paul G. Willetts, one of which is described in the patent of Willetts, No. 1,893,313 above referred to. In laying up the crown, it is preferred to use as a mortar between the blocks of this material, a cement of the following composition, which has the property of shrinking upon the firing of the furnace to an extent which substantially compensates for the slight expansion of the blocks, thus making the structure of the arches as a whole substantially non-expanding and non-shrinking upon the heating of the furnace.

40%—10 to 24 mesh—calcined grog—burnt, which may be the material disclosed in the Willetts Patent No. 1,893,313 above referred to.
40%—100 mesh—Georgia white bauxite—raw.
20%—100 mesh—Georgia "G-1" bauxitic clay—raw.

No claim is made in this application to this cement or to any uses thereof per se as this subject matter is not a part of the present invention and is not the sole invention of the applicant in this case.

In the form of the invention shown in Fig. 6, the regenerators are not mounted as a unitary structure above the crown of the furnace, as in the forms shown in Figs. 1 to 5. This modified design is in some respects better suited for use in certain glass factories which do not provide sufficient space above the working floor to accommodate the top regenerators of the forms illustrated in Figs. 1 to 5. In this embodiment, the regenerators respectively form two unitary structures, one on either side of the furnace, each enclosed in a suitable outer metal casing 68 and inner insulating shells 69. The operation and control of the furnace so provided is substantially like that of the previously described furnaces. It will be noted that the arrangements of regenerative flues and fuel ports are similar to that heretofore described. Because of the structural rearrangement, the length of the first flight 70 of each regenerator is considerably shortened. It retains to a great extent, however, the self cleaning characteristics of the regenerators illustrated in Figs. 1 to 5 and described above. Also, this form of my invention includes in its construction and design the advantages of accessibility to the burners and tank blocks, and distribution of the weights and thrusts of the several parts, which facilitate the maintenance of the desired pressure conditions in the melting chamber and the attainment of the other advantages set forth above for the forms of the invention of the preceding figures.

In the form of the invention shown in Fig. 7, the regenerators are mounted in a manner in some respects similar to that of Fig. 6, namely, at the side of and below the glass containing basin. In this form, however, the initial vertical upward paths or flights of the regenerators are dispensed with and the initial flights are vertically downward through the regenerator sections 71 and 72. Exhaust gases passing through the regenerator may thus pass from the tank proper, through the passage 73 located in substantially the same relation to the tank as is the passage 35 shown in Fig. 2, thence through the horizontal passage 74, downwardly through the regenerator sections 71 and 72, thence through the cross passage 75, upwardly through the regenerator section 76, transversely through the cross passage 77 and downwardly through the regenerator sections 78 to the outer passage 79. In this way there is provided a regenerator arrangement including a plurality of flights through which the gases and air alternately pass in circuitous paths.

This form of the invention is particularly adaptable to locations in which the space beneath the tank is relatively limited or in which it is desired to restrict the downward extension of the regenerator structure while providing space for the necessary heat transfer. This form of the invention provides substantially the same advantages above described with the exception of those incident to the upward initial flight of the regenerator. Such material as liquefies or becomes solid during the passage through the first flight of the regenerator, namely through regenerator sections 71 and 72, may however be withdrawn from the lower part of the cross passage 75 through a suitable opening or openings (not shown). As in the forms of the invention above described, the regenerator structure used in this form of the invention is adapted to be enclosed by an outer metallic casing 80 within which is a layer of heat insulating material 81, thus providing for the maximum heat economy and at the same time preventing breathing of the regenerator as above set forth. Also this form of the invention includes in its construction and design the advantages of accessibility to the burner and tank blocks, the desired distribution of the weight and thrusts of the several parts, etc., all substantially as described above for the other forms of the invention.

*Automatic control means*

In Fig. 8, I have shown in somewhat diagrammatic form the system of automatic control means which is adaptable to apparatus embodying my invention. This system is illustrated as applied to the forms of the invention shown in Figs. 1 to 3, but it will be understood that it may be similarly applied to other forms of the invention.

There is illustrated in Fig. 8, a firing system particularly adapted for the use of gas, such as natural gas which is available to many glass plants. The gas is supplied through a main supply pipe 82 and first passes through a shut off valve 83. The gas then passes to two branch pipes 84 and 85, the former supplying gas to the high temperature region 18 of the furnace and the latter supplying gas to the rear portion of the furnace for supplying necessary heat to fuse the glass making materials and convert them into glass. Pipes 84 and 85 are provided with adjustable valves 86 and 87 respectively, by which the flow therethrough is variably controlled. Gas from the pipes 84 and 85 then passes to the opposite sides of the furnace through the pipes 88 and 89 respectively, pipes 88 conducting gas to a plurality of burners diagrammatically illustrated at 90. Pipes 89 are similarly provided with a plurality of burners on each side of the furnace, these burners being diagrammatically illustrated at 91. The burners 90 are adapted to project gas inwardly of the furnace through the fuel openings 28 and burners 91 are similarly adapted to project gas inwardly of the furnace through the openings 28B. Interposed in the pipes 88 and 89 are reversing valves generally indicated at 92, these valves being adapted to be operated by a common means alternately to cut off the flow of gas through the pipes 88 and 89 to one side of the furnace and admit gas to these pipes on the other side and then to admit gas to the first side and cut off the supply of gas to the second side.

As stated above, the zone with which regenerators A and A' are associated, is provided with automatic temperature control as is also the rear zone with which regenerators B and B' are associated. Taking up first the hottest zone of the furnace with which regenerators A and A' are associated, there is provided suitable temperature responsive means, for example, a radiation pyrometer generally indicated at 93 (Figs. 1, 2 and 8), this pyrometer projecting through the crown 20 of the tank in a suitable position, as illustrated, to be responsive to the temperature in the portion 18, which is the hottest zone of the furnace. The pyrometer 93 is connected by conductors indicated by the line 94 (Fig. 8) with a control instrument 95. This instrument is in turn connected by conductors generally indicated by the line 96 with a suitable motor operated controlling mechanism generally indicated at 97 which is mechanically connected to operate the valve 86. The details of the construction of the instrument 95 and of the mechanism 97 form no part of the present invention. It is contemplated that suitable apparatus which may be of commercial type, such as may be bought in the open market, will be used.

The rear or melting zone of the furnace is similarly provided with a suitable temperature responsive means diagrammatically illustrated at 98 in Figs. 1 and 8, which may be the radiation pyrometer similar to pyrometer 93. This temperature responsive means is connected by conductors indicated by the line 99 (Fig. 8) with the instrument 95 and this instrument in turn is connected by the conductors indicated by the line 100 with the valve operating mechanism 101 similar to the mechanism 97, which is mechanically connected to operate the valve 87. The instrument 95 is a duplex one and thus serves in connection with both heating zones to respond to the temperatures at these zones, preferably also indicating these temperatures upon a suitable dial, and also controls the supply of the energy to operate the valve operating means 97 and 101. Thus the rate at which fuel is admitted to the two zones through burners 90 and 91 respectively will be controlled by the temperatures in those zones as these temperatures affect the temperature responsive devices 93 and 98 respectively.

When the rate of supply of fuel through the burners 90 or 91 is varied, it is desirable also that the rates of air supply through the regenerators A, A' and B, B' respectively be varied in proper proportion thereto so as to obtain the desired character of flame at all times. For this purpose there are provided instruments 102 and 103 which may be mounted upon a suitable control board adjacent to the furnace and which are similar each to the other.

The instrument 102 is connected by suitable means as tubes 104 and 105 with the pipe 84 to register the flow through this pipe. Any suitable type of flow responsive means may be employed as the Pitot tube, the manometer, or the Venturi throat. The instrument 102 is similarly connected by suitable means as tubes 106 and 107 with the air duct 46 to register the flow therethrough. The flow through the pipe 84 and the duct 46 may be recorded for visual reading and/or for permanent written record by the instrument 102. This instrument, however, is further connected through conductors generally indicated by the line 108 to the valve operating mechanism 109 which variably controls the flow of air through the duct 46 by controlling an adjustable damper in this duct. This control is set so that the proper amount of air is admitted to the tank to secure the desired type of flame for all adjustments of the flow of the gas through pipe 84 by the valve 86.

The instrument 103 is connected by suitable means, as the tubes 110 and 111, with the pipe 85 and by suitable means as tubes 112 and 113 with the air passage 49B for recording and responding to the flow of gas and air to the rear or melting portion of the furnace. This instrument is further connected through the conductors generally indicated by the line 114 with a suitable valve operating mechanism 115 which controls the position of an adjustable damper within the air duct 49B. Thus the admission of air to and through the regenerators B or B' is automatically controlled to proportion this rate of air admission to the rate of gas admission through the pipe 85 and burners 91.

Suitable means are provided for reversing the furnace automatically in response either to the temperatures existing at certain predetermined points in the regenerators or to differentials in those temperatures. This means may be the same or similar to the means shown and described in the Schofield Patent, No. 1,683,809, issued Sept. 11, 1928. As shown (Figs. 1, 2 and 8) there is a thermocouple diagrammatically illustrated at 116 adjacent to the cooler end of each of the regenerators A or A' associated with the hotter portion or zone 18 of the tank in response to which the drafts through all the regenerators are reversed. Thermocouples 116 are connected by conductors indicated by the lines 117 and 118 respectively to the reversing control instrument 119. This instrument is in turn connected with the several mechanisms by which reversal of the drafts in the furnace is effected. As shown, the instrument 119 is connected by conductors generally indicated by the line 120 with the reversible motor 58 which controls the reversing valves 59, as above described, this motor by its arrangement to rotate the shaft 57 being effective to move all four valves 59 for the regenerators A, A', B, B', simultaneously in the proper directions. The instrument 119 is also connected by the conductors generally indicated by the line 121 with an operating mechanism 122 which is effective to turn on or off the shutoff valve 83 in the gas line 82. The instrument 119 is also connected by the conductors indicated by the line 123 with the valve operating mechanism 124 which is mechanically interconnected to all the valves 92 in the gas lines 88 and 89 to effect a reversal of the positions of these valves.

The reversal of the drafts in the furnace may be as above set forth responsive either to the temperature in the regenerator A or A' on one side attaining a certain temperature or in the temperature difference in the temperatures to which the thermocouples 116 are subjected attaining a certain predetermined value. In any event, the instrument 119 is such as to effect the reversal of the drafts by the following operations: first, to cut off the supply of gas through the pipe 82 by closing the valve 83, thus cutting off the supply of heat to the furnace during the reversal. Then, the valves 59 are shifted by the motor 58 and the valves 92 are shifted by the mechanism 124. These operations may occur either simultaneously or in any desired sequence. After these operations have been completed the valve 83 is again opened by the mechanism 122 by which it is operated to start the operations in the new direction.

Means are provided as above set forth for controlling the pressures existing within the hottest central portion 18 of the furnace and the rear melting portion thereof. For this purpose ports 125 (Fig. 1) are provided on either side of the furnace just above the normal glass level 126 and adjacent to the hot zone 18 therein. These ports communicate through the passages 127 and 128 with a common passage 129 which in turn communicates with the instrument 130. This instrument is connected by conductors generally indicated by the line 131 to a valve operating mechanism 132 by which the valve (as shown of the butterfly type) in the exhaust duct 50 is controlled.

Similarly there are provided, adjacent to the rear end of the furnace, ports 133 on either side thereof which communicate through the passages 134 and 135 respectively with a common passage 136 which communicates with the instrument 137 similar to the instrument 130. This instrument is connected by conductors indicated by the line 138 with the valve operating mechanism 139 by which a suitable valve in the exhaust duct 50B is controlled. The instruments 130 and 137 are therefore effective to control the throttling of the exhaust from their associate zones in the tank so as to establish a desired pressure in these zones at all times. These pressures will be accurately determined independently of the direction of flow of the gases from one side or the other due to the connection of the pressure passages with both sides of the furnace. The desired pressure within the tank is usually slightly above atmospheric so that any leakage which may occur through the walls of the tank will be outward rather than inward, thus insuring the existence of the desired conditions within the tank.

The various instruments 95, 102, 103, 119, 130 and 137, and the various valve or damper operating mechanisms 115, 109, 139, 132, 122, 101, 97 and 124 may be of any desired suitable types, preferably such as may be bought in the open market. Inasmuch as it is contemplated to use known commercial types of apparatus, no particular description of their construction and operation other than the above will be given as this subject matter forms per se no part of the present invention.

The glass melting method

The method of making glass preferably employed and for which the furnaces above described are adapted is as follows:

A bath of glass is maintained in the melting chamber which is relatively long and narrow and which is of varying depths, the greatest depth preferably being slightly forward of the mid portion of the chamber and the depth gradually decreasing toward either end thereof. In this bath, controlled heat conditions are maintained such that at the relatively deep portion the glass is always hotter than at any other part of the chamber. This causes convection currents in the glass to rise at this deeper portion, to travel in the upper strata of the glass both forwardly and rearwardly of this section. The glass cools as it moves away from the hot zone and the colder glass returns along the inclined bottoms of the forward and rearward sections of the furnace to the hotter portion where the glass is again reheated. The circulation thus set up repeatedly brings each moiety of the glass to the surface in the hot zone, and thus facilitates the refining and homogenizing operations. The release of the included gases is greatly facilitated by bringing the glass to the surface and there subjecting it to a high temperature which increases its fluidity. The primary or rearward circulation also serves to prevent particles of unmelted glass making materials or batch which are lighter than the glass from floating forwardly on the surface of the bath, so that these particles are maintained rearwardly and under the influence of the heat supplied, particularly by the firing system including regenerators B and B' and fuel openings 28B, until the chemical reactions incident to fusion of the glass making materials have completely taken place and the materials are converted into glass. When such fusion has taken place, the fused material is entrained in the primary circulation of previously melted glass and thereafter follows the lines of the convection currents first in the primary and then in the forward or secondary circulation, until the glass is refined. I preferably raise the bottom of the furnace adjacent to the bridge wall to a higher level than any other portion in the melting chamber, so as to form a weir, which is desirable in reducing the effect of the pull on the furnace upon the secondary circulation of the glass in the melting chamber, and which aids in preventing unfinished glass from passing through the throat 14.

The method contemplates the maintenance during firing of the tank of a constant relatively high temperature, say 2650 to 2700° F. at the deep portion of the tank, irrespective of the rate of feed or the absence of feed and/or of pull upon the tank. The circulation above referred to is thus maintained at all times, whether or not glass is being made and the glass is thoroughly and uniformly conditioned even during stoppages of the manufacturing operations.

During the operation, the flame applied over this deep zone is preferably a substantially neutral flame, which forms a substantially uniform blanket entirely across the relatively narrow bath.

The introduction of gas and air in the manner hereinbefore described facilitates the complete and uniform heating, transversely of the furnace, of the glass in this portion. By insulating the top, bottom and sides of this portion, and by covering it with substantially uniform flame, I can, to a large extent, maintain the circulation mentioned primarily in directions longitudinal of the furnace and greatly minimize currents transversely thereof.

Glass making materials or batch are automatically fed into the rear of the furnace, preferably substantially throughout the width of the bath, onto the glass bath. On entering the furnace, the materials are shielded from the gases of combustion until they are fritted or fused by radiant heat. The rate of feed is such as to maintain the bath level constant, and the fire from the rear firing system is automatically varied in response to temperature at the batch feeding end of the furnace, which temperature varies with the rate at which cool batch is introduced.

In the foregoing description and in the appended claims I have referred to my method and apparatus as referring to the manufacture of "glass", meaning thereby not "glass" in a restrictive sense, but any material of glass-like nature capable of being produced by the method and apparatus set forth herein and/or included in the scope of the appended claims. Among such materials will be water glass and vitreous enamels, etc.

While I have shown and described but a limited number of forms in which my invention may be embodied, it will be understood that both the method and apparatus phases of my invention are capable of inclusion in numerous other embodiments and variations thereof. I do not wish to be limited therefore except by the scope of the appended claims, which are to be construed as broadly as the state of the prior art permits.

I claim:

1. The method of continuously melting and refining glass, which comprises establishing in the melting compartment of a tank furnace a bath of glass of varying depths, the greatest depth being longitudinally intermediate the ends of said bath, feeding glass-making materials into one end of the bath and removing glass from the other end thereof, and creating active convection currents in the bath by maintaining the temperature of the glass in the relatively deep intermediate portion higher than elsewhere in the bath, whereby said currents rise in said deep portion and move in both directions longitudinally of the bath adjacent to the surface thereof, and thence downwardly along the sloping walls of the compartment again to the relatively deep portion.

2. The method of continuously melting and refining glass, which comprises establishing in the melting compartment of a tank furnace a bath of glass of varying depths, the greatest depth being longitudinally intermediate the ends of said bath and in a zone of the furnace which is insulated to reduce the heat losses through the walls thereof below those of other portions of the glass containing walls, applying heat of combustion to the surface of the glass of said bath in the relatively deep portion thereof, feeding glass-making materials into one end of the bath and removing glass from the other end thereof, and creating active convection currents in the bath by maintaining the temperature of the glass in the relatively deep intermediate portion higher than elsewhere in the bath, whereby said currents rise in said deep portion and move in both directions longitudinally of the bath adjacent to the surface thereof, and thence downwardly along the sloping walls of the compartment again to the relatively deep portion.

3. The method of continuously making glass in a tank furnace having a melting chamber and a workout chamber, which comprises establishing a bath of glass in the furnace, said bath having varying depths longitudinally of the melting chamber, being relatively deep at a zone intermediate the forward and rear ends of said melting chamber and becoming gradually shallower as it approaches the two ends of the chamber, applying heat locally to the deeper zone of the glass bath to heat the glass of such zone to a temperature higher than that in the shallower portions of the melting chamber and thereby creating convection currents which move upwardly at said zone and extend both forwardly and rearwardly of said zone, feeding glass-making materials onto the rear shallower portion of the bath at a rate such as to maintain constant the level of the glass in the furnace, heating the glass in such rearward portion and the glass-making materials thereon by separately controlled heating means to a temperature sufficient to effect fusion of the glass making materials but less than that maintained at the relatively deep zone of the bath, and thus fusing the glass-making materials and converting them into glass in said rearward portion, moving the glass thus formed repeatedly in the paths of the aforesaid convection currents to bring it repeatedly to the surface of the glass at the relatively deep zone of the bath for the release of included gases, and passing the glass thus refined from the melting chamber to the work-out chamber.

4. The method of continuously making glass in a tank furnace having a melting chamber and a workout chamber, which comprises establishing a bath of glass in the furnace, said bath having varying depths longitudinally of the melting chamber, being relatively deep at a zone intermediate the forward and rear ends of said melting chamber and becoming gradually shallower as it approaches the two ends of the melting chamber, applying heat locally to the surface of the deeper zone of the glass bath by applying a sheet of flame of substantially uniform temperature to the entire surface of such deep zone to heat the glass in such zone to a temperature higher than that in the shallower portions of the melting chamber and thereby creating convection currents which move upwardly at said zone and extend both forwardly and rearwardly of said zone, feeding glass-making materials onto the rear shallower portion of the bath at a rate such as to maintain constant the level of the glass in the furnace, heating the glass in such rearward portion and the glass making materials thereon by separately controlled heating means to a temperature sufficient to effect fusion of the glass-making materials, but less than that maintained at the relatively deep zone of the bath and thus fusing the glass-making materials and converting them into glass in said rearward portion while the glass thus formed moves repeatedly in the paths of the aforesaid convection currents and is brought repeatedly to the surface of the glass at the relatively deep portion of the bath for the release of included gases, and passing the glass thus refined from the melting chamber to the work-out chamber.

5. The method of continuously making glass as recited in claim 3, characterized by the steps of controlling the heat applied to the portion of the bath rearward of the deep zone in response to variations in the temperature adjacent to the rear wall of the melting chamber, and independently controlling the heat applied to the deep zone in accordance with the temperature existing at said deep zone.

6. The method of continuously making glass as recited in claim 3, characterized by the automatic regulation of the gaseous pressure above the bath of glass to maintain the same constant irrespective of variations in the application of heat to the glass.

7. A continuous glass melting furnace having a melting end and a workout end separated by a bridge wall, the bottom of the melting end sloping downwardly in both longitudinal directions to a zone substantially removed from the rear of the furnace and from the bridge wall, whereby the melting end is adapted to contain a bath of glass that is relatively deep at such zone and relatively shallow at the rear of the furnace and adjacent to the bridge wall, and means for applying heat locally to the glass at such relatively deep zone to maintain the glass therein at a temperature higher than the temperature of the glass in other portions of the bath, whereby active upwardly moving convection currents are established in the relatively deep zone, moving forwardly and rearwardly of the melting end of the furnace and returning along the sloping bottom walls of said melting end.

8. A continuous glass melting furnace having a melting end and a workout end separated by a bridge wall, the bottom of the melting end sloping downwardly in both longitudinal directions to a zone substantially removed from the rear of the furnace and from the bridge wall, whereby the melting end is adapted to contain a bath of glass that is relatively deep at such zone and relatively shallow at the rear of the furnace and adjacent to the bridge wall, a layer of insulating material on the glass containing walls of the deep zone only, whereby the loss of heat through the walls at such zone is less than through such walls in other portions of the melting chamber, and means for applying heat locally to the glass at such relatively deep zone to maintain the glass therein at a temperature higher than the temperature of the glass in other portions of the bath, whereby active upwardly moving convection currents are established in the relatively deep zone, moving forwardly and rearwardly of that zone and returning along the sloping bottom walls of said chamber.

9. A continuous glass melting furnace having a melting end and a workout end separated by a bridge wall, the bottom of the melting end sloping downwardly in both longitudinal directions to a zone substantially removed from the rear of the furnace and from the bridge wall, whereby the melting end is adapted to contain a bath of glass that is relatively deep at such zone and relatively shallow at the rear of the furnace and adjacent to the bridge wall, means for applying heat locally to the glass at such relatively deep zone to maintain the glass therein at a temperature higher than the temperature of the glass in other portions of the bath, whereby active upwardly moving convection currents are established in the relatively deep zone, moving forwardly and rearwardly of that zone and returning along the sloping bottom walls of said melting end, and means for automatically controlling the temperature at the deep zone independently of temperatures at other zones.

10. A continuous glass melting furnace having a melting end and a workout end separated by a bridge wall, the bottom of the melting end sloping downwardly in both longitudinal directions to a zone substantially removed from the rear of the furnace and from the bridge wall, whereby the melting end is adapted to contain a bath of glass that is relatively deep at such zone and relatively shallow at the rear of the furnace and adjacent to the bridge wall, means for applying heat locally to the glass at such relatively deep zone to maintain the glass therein at a temperature higher than the temperature of the glass in other portions of the bath, whereby active upwardly moving convection currents are established in the relatively deep zone, moving forwardly and rearwardly of that zone and returning along the sloping bottom walls of said melting end, and means for automatically controlling the temperature at the deep zone to maintain a uniform temperature therein regardless of variations in the rate of feed to or pull on the tank.

11. A continuous glass melting furnace having a melting end and a workout end separated by a bridge wall, the bottom of the melting end sloping downwardly in both longitudinal directions to a zone substantially removed from the rear of the furnace and from the bridge wall, whereby the melting end is adapted to contain a bath of glass that is relatively deep at such zone and relatively shallow at the rear of the furnace and adjacent to the bridge wall, means for applying heat locally to the glass at such relatively deep zone to maintain the glass therein at a temperature higher than the temperature of the glass in other portions of the bath, whereby active upwardly moving convection currents are established in the relatively deep zone, moving forwardly and rearwardly of that zone and returning along the sloping bottom walls of said melting end, means for controlling the heat applied to the deep zone in accordance with the temperature therein, means for independently controlling the heat applied to the bath rearward of the deep zone in accordance with the temperatures existing adjacent to the rear wall of said melting end, and means for feeding glass-making materials into the bath adjacent to said rear wall.

12. A glass melting furnace having a melting chamber and a workout chamber, a heat recovery system associated with the melting chamber and communicating therewith by flues through the crown of said furnace for projecting preheated air downwardly into the chamber, and fuel supply means including ports entering the furnace below the crown adapted to project fuel into the melting chamber and across the path of the preheated air, whereby prompt and intimate mixture of the preheated air and fuel occurs in the melting chamber.

13. A glass furnace having a melting chamber, a heat recovery system associated therewith and communicating with the melting chamber by flues, fuel ports also opening into said chamber independently of said flues, the flues and ports entering the chamber in such manner as to project air and fuel into the chamber in paths which intersect at an angle of more than 45°, the air entering the chamber above the fuel.

14. A continuous glass melting tank comprising a melting chamber, a workout chamber, a bridge wall separating said chambers, a crown covering the said chambers, two pairs of regenerators, each of said regenerators communicating with the interior of the melting chamber by flues through said crown, fuel ports located in the side walls of the furnace below the entrance of the regenerator flues into the furnace for directing fuel into the melting chamber, the said fuel ports and associated flues from the regenerators being of such number and so disposed as to create a substantially continuous sheet of flame extending entirely across the furnace, means for reversing the regenerators in response to slight temperature changes in the regenerators to minimize the fluctuation in heat supply to the glass, separate means for independently regulating the heat supplied by the heating means including the two sets of regenerators, whereby a constant high temperature may be maintained by the forward regenerators at a point intermediate the ends of the melting chamber and a lower temperature may be supplied by the regenerators rearwardly thereof for fusing glass-making materials supplied to the furnace, and means for feeding glass-making materials into the rear of the melting chamber.

15. The method of continuously making glass in a tank furnace having a melting chamber, a workout chamber, and two separately controlled sets of regenerators, which comprises establishing a bath of glass in the melting chamber, applying heat to the bath by projecting fuel through the side walls of the melting chamber in a generally horizontal direction, projecting air through the furnace crown into the chamber in a downward direction into the fuel to cause combustion in the melting chamber and to create a substantially continuous sheet of flame extending entirely across the furnace, maintaining the flame intensity substantially constant by frequently reversing the direction of the flame in response to relatively slight changes in temperature conditions in the regenerators, independently regulating the heat supplied by the heating means including the two sets of regenerators to maintain a constant high temperature for refining the glass in a longitudinal mid-section of the melting chamber, and a lower temperature for fusing glass-making materials rearwardly of such section, the heat supplied rearwardly of the mid-section being varied in accordance with the rate of feed of ingredients to the furnace.

16. A continuous glass melting furance, comprising a melting chamber, means for supplying batch to the rear end of said chamber, a plurality of separately controlled heating means, each comprising a set of closely spaced burners in the opposing side walls of the furnace, regenerators located above the crown of the furnace and connected therewith by flues passing through said crown, each of said regenerators having initial passages for removing products of combustion upwardly of sufficient length to cool said products to the point at which at least a major portion of the condensable materials included therein will liquefy, and means for segregating such liquefied material to prevent contamination of the glass thereby and at a point such that it may easily be removed from the furnace.

17. In a continuous glass making furnace, a melting chamber comprising a glass containing basin and a crown, regenerators located at least in part above the level of the crown, regenerator flues through the crown, burner ports in the side walls below said crown and said flues, the said regenerators comprising an initial upward flight for the products of combustion through substantially unobstructed passages extending at least to a point at which a major portion of the condensable materials included in the flue gases will liquefy and flow down and out of said passages, and means for segregating such material away from the glass in the furnace.

18. In a continuous glass making furnace, a melting chamber comprising a glass containing basin and a crown thereabove, openings in the rearward end of said chamber for the supplying of glass making materials onto the surface of the bath of glass in the chamber, a firing system including burners in the side walls of the furnace and regenerators having flues entering the furnace through the crown, and means for protecting the glass making materials from the dynamic effect of the combustion gases until they are fritted by radiant heat in the furnace.

19. A glass making furnace, comprising a glass containing basin, a crown with depending side wall portions supported independently of the basin, tuck stones sealing the connection between the top of the basin walls and the cooperating portions of the crown structure, heat recovery means above said basin and crown and laterally overhanging said crown, and short metallic piers supporting the overhanging portions of said heat recovery means and the crown, said construction providing a minimum of relative expansive movement such as would tend to break the seal at the tuck stones and also providing ready access to such breaks in the seal as may occur upon heating of the furnace.

20. In a regenerative glass melting furnace, a glass containing basin, a crown therefor, pairs of regenerators, at least a portion of which are above the level of the crown and communicate with the furnace by flues through the crown, said regenerators being surrounded by insulation and sheathed in metal to prevent breathing thereof, means for supplying uniform and controlled volumes of air to each of the regenerators including a fan, and means for forcibly and controllably removing waste gases from the furnace through the regenerators.

21. In a regenerative glass melting furnace, a glass containing basin, a crown therefor, pairs of regenerators, portions at least of which are above the level of the crown and communicate with the furnace by flues through the crown, said regenerators being surrounded by insulation and sheathed in metal to prevent breathing thereof, means for supplying uniform and controlled volumes of air to each of the regenerators including a fan, means for forcibly and controllably removing waste gases from the furnace through the regenerators, fuel ports below the regenerator ports, means for supplying and directing fuel therethrough, and automatic means controlling the fuel supply means and the air supply means of the regenerators in response to heat conditions in the furnace adjacent to the place of introduction of the fuel and air into the furnace.

22. The method of making glass in a continuous glass furnace, which comprises maintaining a bath of glass in the melting chamber of the furnace, maintaining a hot zone at a selected place intermediate the ends of the melting chamber by the application of heat from one firing system, supplying glass making materials at one end of the bath, fusing the materials by heat supplied from a second firing system independent of the first firing system, maintaining a constant pressure in the furnace, regulating the input of heat from the first firing system in response to conditions adjacent to the hot zone, controlling the heat input from the second firing system in response to heat conditions adjacent to the point of feed of the glass-making materials, and regulating the draft conditions in response to variations in pressure in the chamber to maintain the pressure substantially constant independently of variations in the heat input from the firing systems.

23. The method of making glass in a continuous glass furnace, which comprises maintaining a bath of glass in the melting chamber of the furnace, maintaining a hot zone at a selected place intermediate the ends of the furnace by the application of heat from one firing system including a set of regenerators, supplying glass-making materials at one end of the melting chamber, fusing the materials by heat supplied from a second firing system including a set of regenerators independent of the first regenerators, maintaining constant pressure in the furnace, frequently reversing the regenerators of the two firing systems in response to slight variations in temperature conditions therein, regulating the input of heat from the first firing system in response to conditions adjacent to the hot zone, controlling the heat input from the second firing system in response to the heat condition adjacent to the point of feed of glass making materials, and regulating the draft conditions in response to variations in pressure in the chamber to maintain the pressure substantially constant independent of variations in the heat input from the firing systems.

24. A glass making furnace having a melting end and a pair of regenerators associated therewith and connected thereto by flues entering the chamber through the crown of the furnace, each of said regenerators comprising a plurality of vertical flights arranged side by side and providing a tortuous path for the gases and air from and to the chamber, the flight nearest said flues extending upwardly above the furnace and providing for the upward flight of exhaust gases.

25. In a glass melting furnace, a melting end having a glass containing basin and a crown thereabove, regenerators associated therewith and communicating with the chamber by flues passing through the crown, each of said regenerators comprising a plurality of vertical flights, the flight adjacent to the furnace being arranged for the upward movement of exhaust gases, the regenerators comprising a compact unit, and metal sheathing completely inclosing the regenerators to prevent the leakage of air thereinto.

26. A glass making furnace, comprising a glass containing basin, a crown therefor, heat insulation over the crown, regenerators above the crown and communicating with the furnace by flues through the crown, said regenerators each comprising a plurality of vertical sections adapted to create a tortuous path for the gases and air passing from and to the furnace, a support for carrying the weight of the regenerators independently of the crown, and means for cooling said support.

27. In combination with a glass melting furnace comprising a glass containing basin and a crown therefor, a pair of regenerators mounted above the crown and communicating therewith through the crown, means for supplying controlled amounts of air alternately to the regenerators, means for controllably exhausting air alternately from the regenerators, and a valve structure mounted on the regenerators and readily accessible, said valve structure comprising chambers communicating with said regenerators respectively, chambers connected to the air supply means and the exhaust means respectively and having valved communication with the first-named chambers, a valve associated with each regenerator for alternately connecting the regenerator with the source of supply and the exhaust, said valve comprising a metallic disc, a reciprocating shaft loosely supporting said disc, mechanical means for moving the valve from a position connecting its regenerator with the source of air supply to a position connecting it with the exhaust means, motor means for simultaneously moving the valves of each regenerator of a set, and means for controlling the motor means in response to variations in temperature conditions in the regenerators.

28. In combination with a glass making furnace, a pair of regenerators, flues connecting the regenerators with the furnace, flues from the regenerators adapted to be alternately in communication with a source of air supply and an exhaust means, a valve structure for effecting the alternate communication of the regenerators with the air supply and exhaust means, comprising a pair of valve chambers, each constantly connected with one of said regenerators and communicating through valved openings with chambers constantly communicating respectively with the source of air supply and with the exhaust means, a valve associated with each regenerator and comprising a reciprocable shaft, a metallic disc loosely mounted on the shaft and adapted alternately to open and close communication between the regenerator chamber and the air supply and exhaust chambers, a rack carried by the shaft, a pinion for driving the rack, a reversible motor for driving the pinion, and means for driving the motor in reverse directions in response to variations in temperature in the regenerators, whereby each regenerator is alternately connected with the source of supply and the exhaust means.

29. The method of making glass in a continuous glass furnace which comprises, maintaining a bath of glass up to a predetermined level in the furnace, supplying heat from one regenerative firing system principally to one zone of the furnace, supplying glass making materials at one end of said furnace, fusing the materials by heat supplied from a second regenerative firing system independent of the first system, maintaining predetermined pressure conditions in the furnace, regulating the input of heat from the first firing system in response to temperature conditions in the zone supplied by said first system, controlling the heat input from the second firing system in response to heat conditions adjacent to the point of feed of glass making materials to the furnace, and regulating the draft conditions in response to variations in pressure in the furnace to maintain predetermined pressure conditions in the furnace independent of variations of the heat input in the firing systems.

30. A furnace for making glass, comprising a container for holding a bath of glass up to a predetermined level therein, a plurality of separately controllable firing systems to supply heat principally to different zones in the furnace in which the melting and refining of the glass take place, means for automatically controlling the drafts of the firing systems in response to variations in the pressure in the furnace to maintain predetermined pressure conditions above the glass bath.

31. A furnace for making glass, comprising a container for holding a bath of glass up to a predetermined level therein, a plurality of separately controllable firing systems including regenerators for supplying heat principally to different zones in the furnace in which melting and refining of the glass take place, and means for regulating the heat input from each of said firing systems in response to the temperature conditions in the zones principally supplied by said systems respectively.

32. A furnace for making glass comprising a container for holding a bath of glass up to a predetermined level therein, a plurality of separately controllable firing systems including regenerators to supply heat principally to different zones in the furnace in which melting and refining of the glass take place, means for automatically controlling the drafts of said firing systems in response to variations in the pressure in the furnace to maintain predetermined pressure conditions above the glass bath, and means for regulating the heat input from each of said firing systems in response to temperatures in the zones principally supplied by said systems respectively.

33. The process of producing molten glass consisting in first subjecting the glass batch to a relatively low temperature until the ingredients are in substantially complete solution, then subjecting the molten glass to a relatively higher temperature to effect the release of seeds therefrom, and in then cooling the glass.

34. The process of producing molten glass consisting in first melting the glass batch ingredients at a relatively low temperature to cause substantially complete combination thereof, then heating the molten glass to a relatively higher temperature to effect the release of seeds therefrom, and in then successively refining and cooling the glass.

35. The process of producing molten glass consisting in first melting the glass batch at a relatively low temperature to form a pool of molten glass, then superheating the glass to raise the temperature thereof to a point above the melting temperature to effect the release of seeds therefrom, and in then cooling the glass.

36. The process of producing molten glass consisting in first subjecting the glass batch to a relatively low temperature until the ingredients are in substantially complete solution, causing the molten glass produced to flow in a substantially straight unbroken path successively through a superheating zone and cooling zone into a working zone, and in subjecting the molten glass as it flows through said superheating zone to a temperature which is relatively higher than the melting temperature to effect the release of seeds therefrom.

37. The process of producing molten glass consisting in first melting the glass batch ingredients at a relatively low temperature to cause substantially complete combination thereof, causing the molten glass to flow continuously through a superheating zone, refining zone, and cooling zone into a working receptacle, and in heating the glass as it flows through said superheating zone to raise the temperature thereof to a point above the melting temperature to effect the release of seeds therefrom.

38. The process of producing molten glass consisting in first melting the glass batch at a relatively low temperature in the melting end of a continuous tank furnace to form a pool of molten glass, in setting up a continuous flow of the molten glass from said melting end through the superheating and cooling zones of the furnace into a working zone, and in heating the glass to a relatively higher temperature as it flows through said superheating zone to effect the release of seeds therefrom.

39. The process of producing molten glass consisting in first melting the glass batch at a relatively low temperature in the melting end of a continuous tank furnace to form a pool of molten glass, in setting up a continuous flow of the molten glass from said melting end through the superheating refining, and cooling zones of the furnace into a working zone, and in heating the glass within the superheating zone to raise the temperature thereof to a point above the melting temperature to effect the release of seeds therefrom.

VERGIL MULHOLLAND.